United States Patent [19]
Charamel et al.

[11] 3,790,725
[45] Feb. 5, 1974

[54] LINEARLY EXTENDING ELECTRICAL DISTRIBUTION SYSTEM HAVING EXTRUDED SHAPE CONDUCTOR RAILS

[75] Inventors: Pierre Charamel, Les Cotes de Sassenage; Raymond Bresson, Grenoble, both of France

[73] Assignee: Merlin Gerin, Societe Anonyme, Grenoble, France

[22] Filed: Nov. 23, 1971

[21] Appl. No.: 201,510

[30] Foreign Application Priority Data
Nov. 30, 1970  France ............................... 7043078
Jan. 22, 1971  France ............................... 7102907
May 11, 1971  France ............................... 7117070

[52] U.S. Cl. ................................. 191/29, 238/231
[51] Int. Cl. ............................................. B60m 1/30
[58] Field of Search ... 191/22, 23 R, 29, 30, 31, 32, 191/33, 35, 40, 44.1; 238/231, 232, 234, 236, 237; 174/88 B, 99 E, 138 B, 13

[56] References Cited
UNITED STATES PATENTS
748,810   1/1904   Taylor ............................. 191/23 R
3,449,532  6/1969   Dehn ................................. 191/29
1,080,481  12/1913  Riddle ............................... 238/234
2,193,262  3/1940   Wisenor ............................. 238/231
3,345,471  10/1967  Kilburg ............................ 191/23 R
503,519    8/1893   Bennett ............................. 191/32
1,125,816  1/1915   Clark ............................... 191/44.1

Primary Examiner—Gerald M. Forlenza
Assistant Examiner—D. W. Keen
Attorney, Agent, or Firm—Stevens, Davis, Miller & Mosher

[57] ABSTRACT

A linearly extending electrical distribution system for a high speed vehicle driving a current collecting head. At least three conductor rails are provided by longitudinal aligned and spaced apart extruded shapes clamped to transverse C-shaped insulating support members. Expansion joints are provided by connector bars in telescoping relationship with the extruded shapes.

5 Claims, 8 Drawing Figures

LINEARLY EXTENDING ELECTRICAL DISTRIBUTION SYSTEM HAVING EXTRUDED SHAPE CONDUCTOR RAILS

This invention relates to a linearly extending electrical distribution system having extruded shape conductor rails adapted for sliding contact with a current collecting system.

Distribution systems of this kind have been proposed for use with high-speed vehicles, such as air cushion supported vehicles. Such systems have utilized a plurality of, generally three, conductor rails defining between them a passageway for a current collecting device comprising a number of rows of contact shoes, one row for each rail, transmitting the current collected from the rails to the vehicle for on-board uses. The contact shoes are resiliently urged towards the rails and comprise a contact surface mating with the contact surface of the rails. The contact shoes are supported from a collector head which is driven by the vehicle and supported in a manner permitting small transverse movements of the vehicle with respect to the collector head, due to irregularities of the track or to inertia movements of the vehicle and of the collector head which is guided in the passageway by the conductor rails.

It has already been proposed to utilize extruded shape conductor rails having a high moment of inertia and the rigidity of which permits to space apart the support members for the rails at relatively long intervals along the track. It is a first object of the invention to provide a rail assembly of an advantageous structure permitting rapid assembly of the rail elements and of the expansion joints.

It is another object of the invention to provide a distribution system of the kind mentioned having extruded rails of a one-piece shape providing high mechanical rigidity and still simpler assembling conditions with regard to the support members.

It is another object of the invention to provide a low cost distribution system having support members for the rails of simple construction leaving one side of the system free for receiving the support system for the collector head.

It is a further object of the invention to provide a distribution system which has expansion joints between aligned sections of conductor rails permitting a rapid and simple assembling of the rails and the joints without sacrificing the needed continuity of the contact surfaces of successive rail portions in assembled condition.

It is still another object of the invention to provide a distribution system wherein the current supplying conductor rails are supported in a manner permitting the rails to execute expansion movements in their support members without affecting the electrical continuity between longitudinally aligned rails nor the surface continuity of the contact surfaces across the expansion joints.

These and other objects and advantages will become apparent and a fuller understanding of the invention may be had upon reading of the following description and claims, taken in conjunction with the accompanying drawings.

Figure 1:
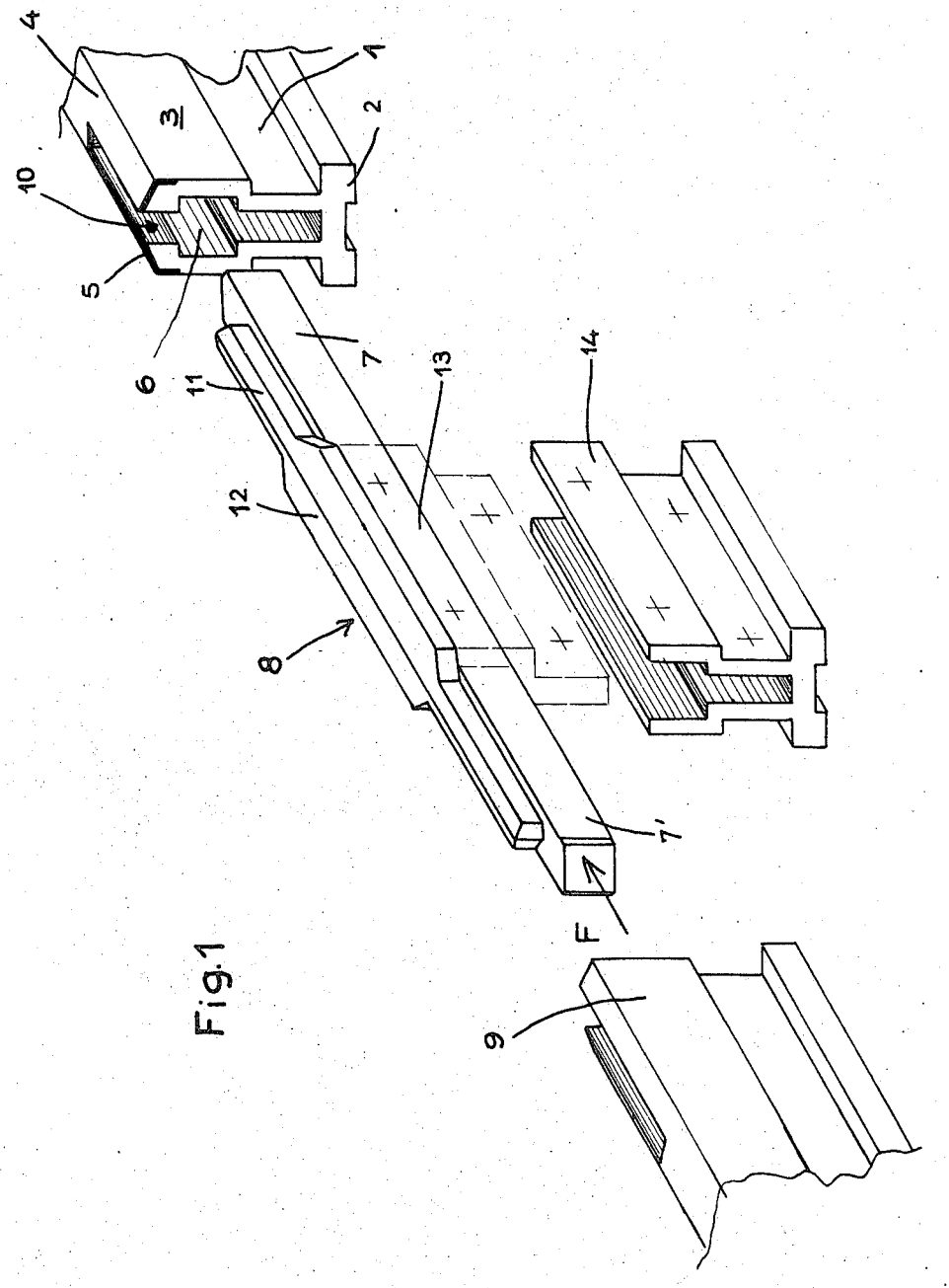
FIG. 1 is an exploded, isometric view of an expansion joint joining the confronting end portions of a pair of longitudinally aligned conductor rails according to a first embodiment of the invention.

In FIG. 1, a conductor rail is formed of an assembly of longitudinally aligned and spaced apart metal rail elements 1, 9 consisting of extruded shapes of light alloy, in particular aluminum, having a base 2 fastened to support members (not shown) spaced along the rail. The opposite end part of each rail element is shaped as a convex dihedral front contact surface 4 and covered by a contact sheet of stainless steel 5. The side faces 3 have inner walls defining with the faces 2 and 4 a cavity for the accomodation of a male end portion 7 of a metal connector bar 8 which is adapted to be plugged into the cavity of the end portions of rail element 1. The connector bar 8 is symmetrical and has an end portion 7' opposite the end portion 7 and capable of fitting in an adjacent rail element 9 longitudinally aligned with the rail element 1. For reasons of clarity in description, only the joint between the end portion 7 of the connector bar 8 and the rail element 1 will be described in detail, the opposite joint being identical. The male end 7 comprises a prismatic part of a cross-section which is complementary to the cavity 6 in which it fits with soft friction, this cross-section being square in the example shown in FIG. 1 and taking up only a part of the recess of the section 3. The end of the rail element 1 is notched at 10 so as to split the contact surface 4 and permit the insertion of a complementary part 11 borne by the end 7 of the connector bar 8. The upper surface of the part 11 is cut in a dihedral shape so as to be flush with the contact surface 4 in inserted position of the connector bar 8. The contact surface part 11 is extended by an enlarged contact surface part 12 of solid cross-section which assures the continuity of the contact surface between the two spaced apart rail elements 1 and 9.

The lower prismatic extended portion of the ends 7 and 7' of the connector bar 8 is inserted into a support element 14 of a profile similar or identical to that of the slotted end portion of rail element 1. The fastening can be effected in any manner whatsoever, for instance by screws or rivets, which have been represented schematically in FIG. 1 by +—marks. The support element 14 is preferably fastened to a post (not shown) identical to the support posts for the rail element 1, as will be explained hereunder. The connector bar 8 may advantageously be of stainless steel so as to provide a contact surface of the same kind along the entire rail.

It is easy to understand that in assembled position of the different elements of the rail, the support 14 being held fixed, each end of the elements 1, 9 is capable of carrying out a movement of thermal translation which is perfectly guided by the plugged parts 7, 7'. The continuity of the contact surface 4, 11, 12 with which a movable contact shoe (not shown), for instance of copper or of low-carbon-copper alloy, cooperates, is retained practically along the entire rail, a reduction by about one-half of the contact surface occuring solely in the expansion spaces provided at the connector bar junctions.

In FIGS. 2 to 5, three rail-shaped conductors 15, 16, 17 extend parallel along a path of displacement of a vehicle (not shown), for instance a vehicle which is supported from the ground and propelled by an electric, such as a linear motor. Seen in cross-section, the rails 15, 16, 17 are arranged at the apices of an equilateral triangle and define a passageway or tunnel for a current collecting collector head (not shown) bearing the contact shoes which are urged into contact with the rails 15 to 17. The current collecting head is guided in its displacement by the rails through the contact shoes in a now well known manner. The rails 15 to 17 are borne by transverse support brackets such as 18, 19, distributed along the entire length of the rails 15 to 17. The support brackets 18, 19 are preferably entirely of insulating material and at their base portions by any suitable means a foundation, such as to the ballast of the track. They are of generally C shape, the upper arm 20 of which bears two rails 15, 16 extending in a horizontal plane in the example shown in FIG. 2. The support brackets 18, 19 embrace peripherally on two of its faces the right prism of triangular cross-section defined by the rails 15, 16, 17, leaving free the side face 22 which gives access to the inner space confined by the rails 15 to 17, in particular for the passage of the electrical and mechanical connecting members (not shown) of the collector head.

A protective covering of the track is formed of plates or screens 24, 26 fastened to the support brackets 18, 19 in such a manner as to surround the upper face of the track as well as the side face opposite the free face 22. The cover 24, 26 makes it possible to avoid accidental contact with the live conductors 15 to 17 and it protects the latter from the weather and against dirt which might affect a good collecting of current.

Figure 5:
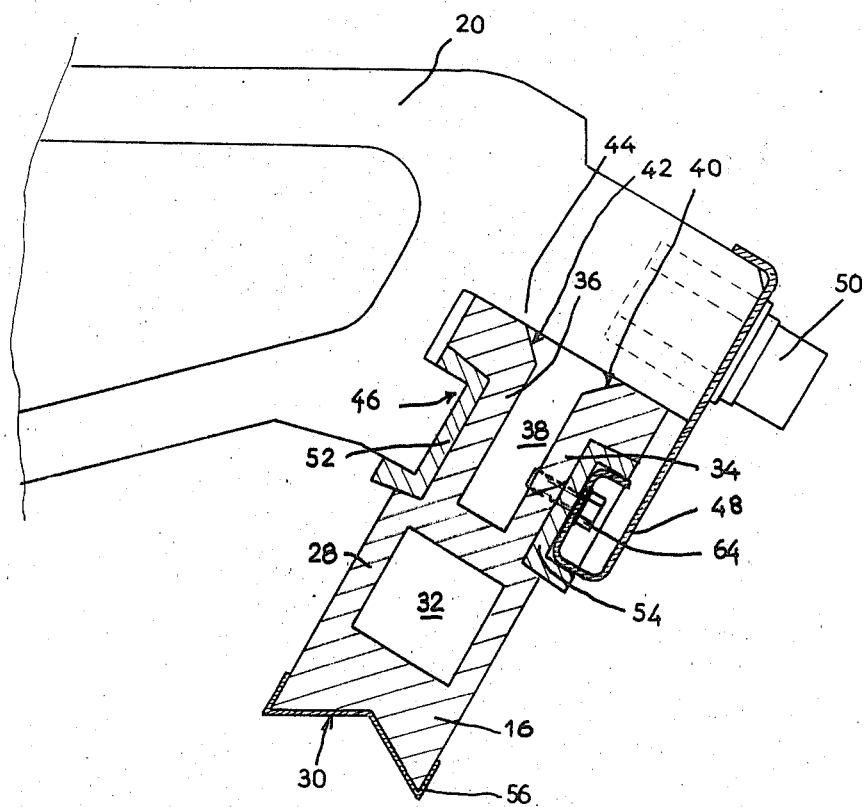
FIG. 5 is a cross-sectional view, at a larger scale of a detail of FIG. 2 showing the assembling of a rail to a support member.

As the extruded shape rails 15 to 17 and the manner of attaching them to the support brackets 18, 19 are all of identical construction, only one rail element 16, will be described in detail, with reference in particular to FIG. 5. The cross-section of each element of the rail 16 has a hollow, more or less rectangular part 28, the front face of which is shaped as a dihedral 30 constituting the contact surface cooperating with the current collecting head. The cavity 32 of the part 28 has a rectangular cross-section. The fastening portion of the rail 16 comprises two side walls or flanges 34, 36 which are connected to the part 28. The flanges 34, 36 are spaced apart so as to define a recess 38 in the form of a slot opening on to the lower face of the rail 16. The flanges defining the recess 38 are beveled at 40, 42 for reasons which will become clearer from the following.

The arm 20 of the C-shaped support member has a flat bearing surface 44 for the base of the flanges 34, 36 of the rail 16, as well as a projection 46 engaging a recessed portion or groove of the side wall 36. The rail 16 is held by a clamping plate 48 which surrounds the flange 34 and is fastened to the arm 20 by screws 50. The plate 48 and the bearing surfaces 44, 46 of the support 20 constitute a bearing portion clamping the rail 16. The bearing and clamping surfaces of the support member extend parallel to the longitudinal direction of the rail and it is easy to understand that only frictional forces oppose to longitudinal sliding of the rail element with respect to the support 20. The jaws of the clamp 46, 48 may advantageously be lined with shoes 52, 54 of synthetic material.

The clamping plate 48 has a resilient portion which is curved in such a manner as to present a slight elasticity which absorbs possible disalignments or imperfections of the rail and the support members. The mounting is extremely simple and fast, the rail 16 being perfectly positioned by the bearing surfaces of the support members before fastening of the clamp 48. The rail element 16 is advantageously of extruded aluminum, the contact face 30 being covered by a sheet of stainless steel 56.

Figure 4:
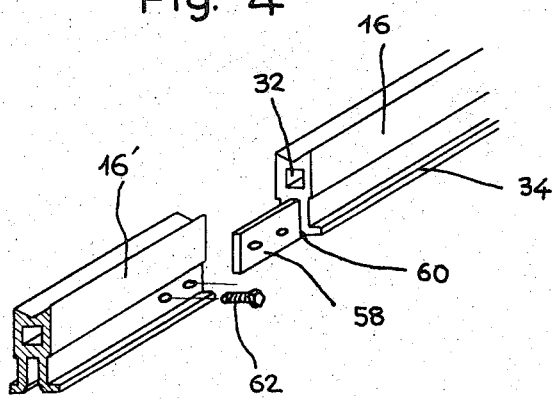
FIG. 4 is an exploded, perspective view of a rigid connection of two successive conductors.

Referring now to FIG. 4, there can be noted a manner of rigidly connecting two consecutive rail elements 16, 16'. A connector bar 58 is inserted in the cavity 38 provided between the flanges 34, 36 of the rail element 16, a weld bead 60 being applied at the place provided by the bevels 40, 42 (see FIG. 5). The presence of the bevels 40, 42 facilitates welding in situ avoiding nay machining or preparation of the parts. The connection by welding assures a perfect mechanical and electrical connection. The remaining protruding part of the connector bar 58 which is fastened to the rail element 16 fits into the corresponding cavity of the other rail element 16' to which it can be removably fastened by bolts 62 or possibly also by welding. The plugging of the connector bar 58 into the ends of the rail elements 16, 16' assures the alignment of the latter which can be completed, if desired, by the insertion of a guide rod in the upper cavity 32 of the rail elements 16, 16'.

Figure 2:
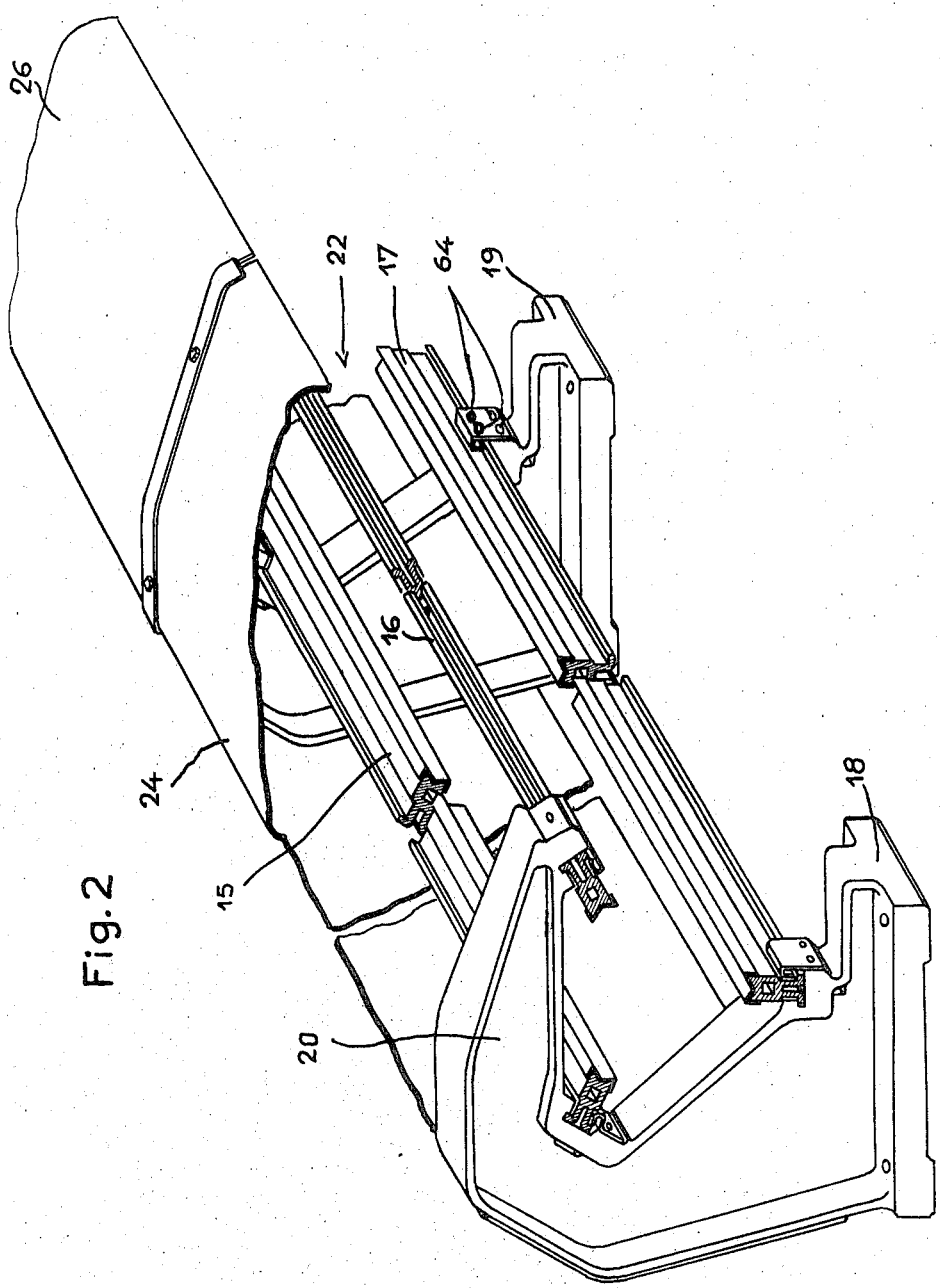
FIG. 2 is a perspective view of a section of a distribution system according to another embodiment of the invention, with a part of the covering removed.

The length of a rail, formed of an assembly of various elements 16, 16', may make it indispensable to provide thermal expansion joints at the confronting ends of subsequent rail elements. Each rail element can be rigidly fastened to one of its support members, preferably in the central region, the thermal expansion taking place on both sides from this fixed point. The standard support brackets 18 can easily be converted into rigid fastening supports by perforating the clamping plate 48 and the corresponding portion of the rail element so as to provide a hole for a pin or stud 64 shown in FIG. 5. The stud 64, of course, prevents any longitudinal movement of the rail element with respect to the corresponding support bracket. In FIG. 2 the support member 19 has been shown as a fixed support, two studs 64 passing through the clamping plate 48 and the rail element 17.

Figure 3:
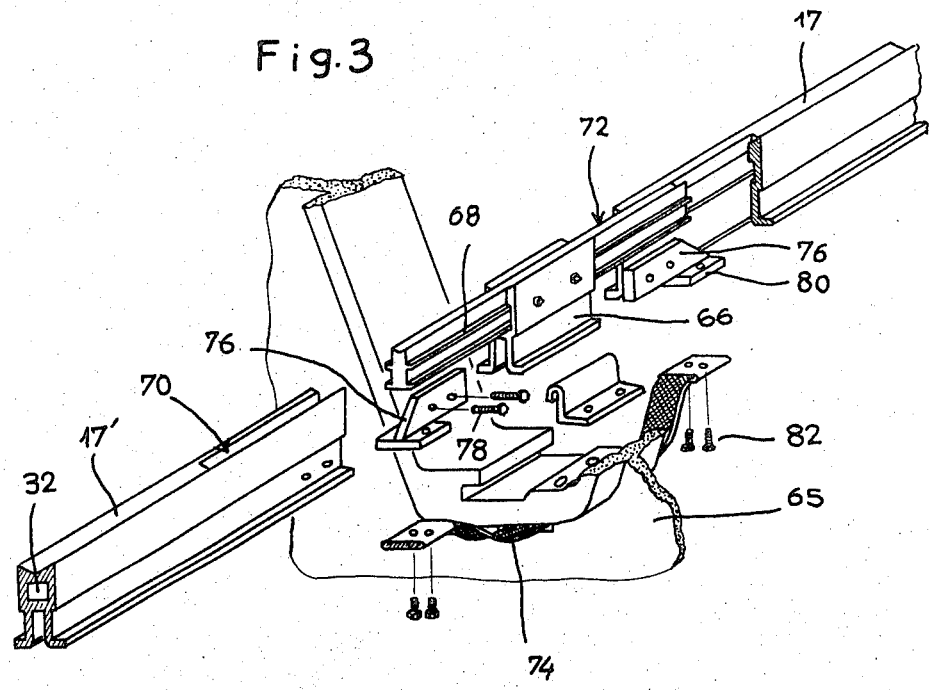
FIG. 3 is an exploded, perspective view at a larger scale of an expansion joint utilized in conjunction with the embodiment of FIG. 2.

At each end of a rail element there is provided an expansion joint which will be described in further detail with reference to FIG. 3 The expansion joint is arranged at the level of a support member 65 to which there is rigidly connected a support element 66 of short length having a profile similar to the rail elements 17, 17' and entirely traversed by a connector bar 68. The part 66 is fastened to the support member 65 by the standard elements, as shown. The connector bar 68 which is fastened to the part 66 protrudes on both sides of the latter and has a cross-section which corresponds to the cavity 32 and to a notch 70 provided in the ends of the rail elements 17, 17'. In assembled position, the rail elements 17, 17' are plugged with soft friction onto the projecting ends of the bar 68, the contact surface 72 of the bar 68 being flush with the contact surfaces of the rail elements 17, 17' so as to assure continuity of said surface along the rail. It will be understood that such a fastening permits only a longitudinal thermal displacement, the alignment of the successive rail elements being perfectly assured. The connector bar 68 is advantageously electrically shunted by a braid 74 the ends of which are connected to the rail elements 17, 17' through a pair of connecting parts 76 which comprise a lug inserted into the slot 38 of the elements 17, 17' and secured to the latter by screws 78. The parts 76 have a contact surface 80 on which the corresponding ends of the braid 74 can be fastened by screws 82. It is easy to see that the mounting of the expansion joint is effected very easily and without any machining in situ. The assembly constitutes a track of simplified structure and relatively low cost of manufacture. It is particularly well adapted to the feeding of current to a vehicle moving at very high speed, for instance at several hundred miles per hour, and supported from the ground.

Figure 6:
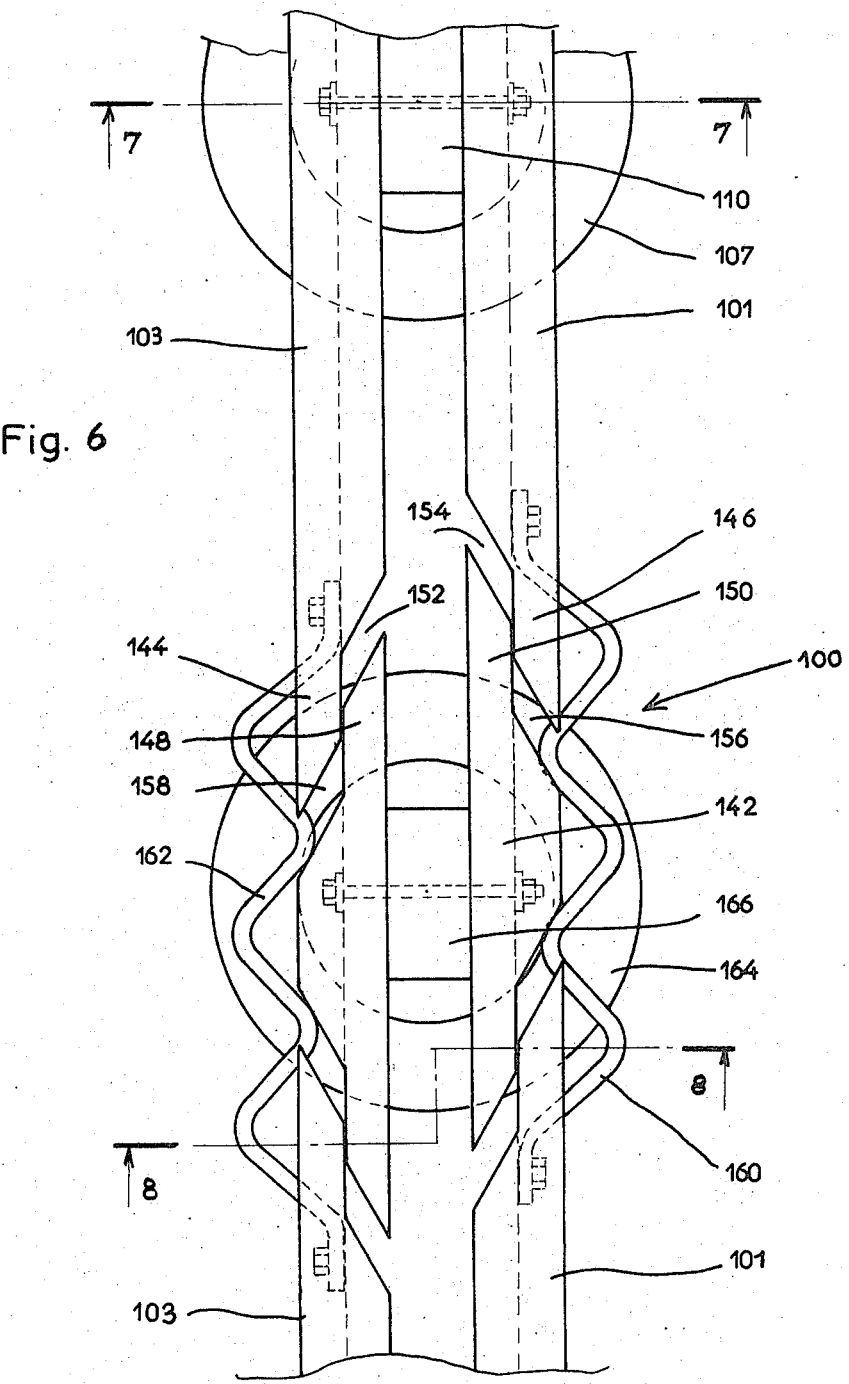
FIG. 6 is a plan view of an expansion joint according to a third embodiment of the invention.
Figure 7:
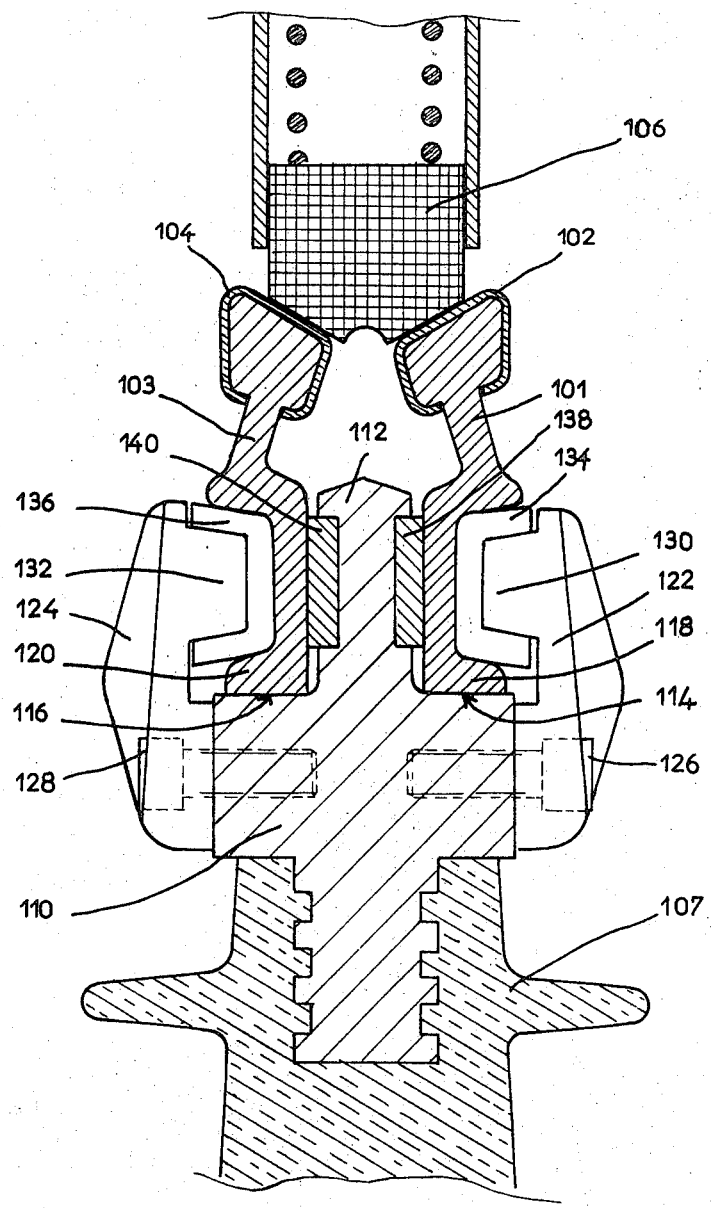
FIG. 7 is a sectional view on the line 7—7 of FIG. 6.
Figure 8:
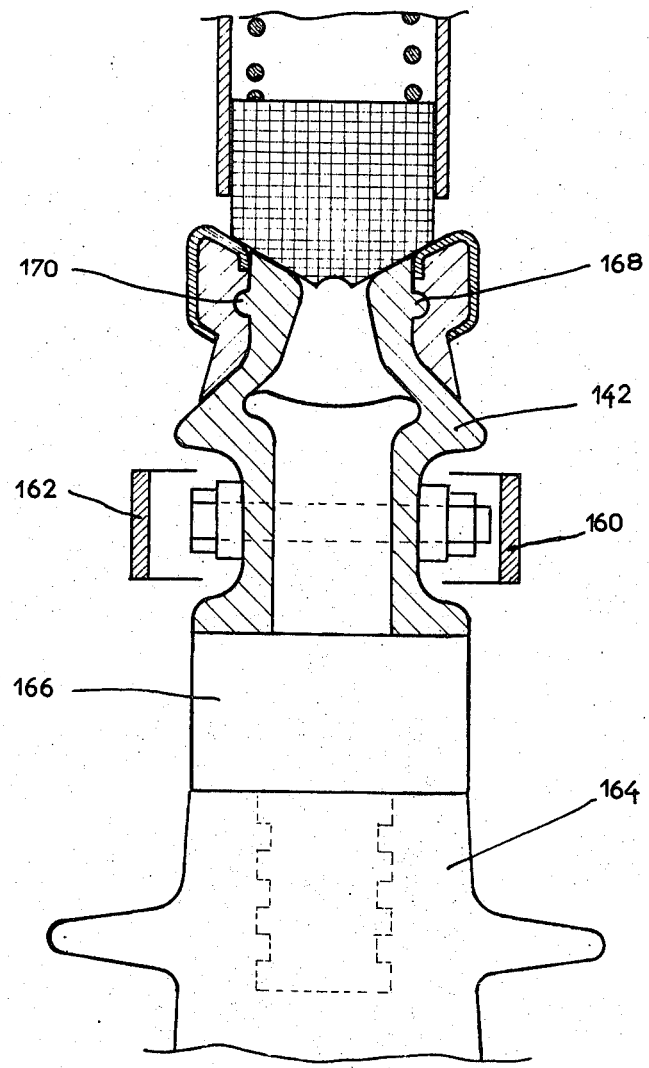
FIG. 8 is a sectional view on the line 8—8 of FIG. 6.

Referring now to the embodiment shown in FIGS. 6 to 8, a conductor rail 100 supplying current to a current collecting device and which forms a part of a plurality of parallel conductor rails constituting a tunnel or passageway for the collecting device in a manner analogous to the embodiment shown in FIG. 2, is composed of a plurality of longitudinally aligned rail elements connected by connector bars at the expansion joints. FIG. 2 shows such an expansion joint but the rail 100 comprises a suitable number of rail elements connected by expansion joints, as desired, all joints being of identical configuration. Each of the two interconnected rail elements shown in FIG. 6 comprises a pair of transversely spaced apart extruded metal shapes 101, 103, the upper end surface of which is bevelled at 102, 104, respectively, to form a dihedral front contact face shaped for slidable contact with one or more movable contact shoes 106 which are biased against the face 102, 104 and which are carried by a collector head (not shown).

A plurality of support members 107 consisting of insulator posts are regularly spaced apart along the rail elements to carry the shapes 101, 103 through junction-blocs 110 secured to the upper end of the insulator posts. Each bloc 110 comprises an upper spacing element 112 defining the lateral spacing of the shapes 101, 103 applied thereto. Each junction-bloc 110 has a pair of opposite horizontal bearing surfaces 114 and 116 supporting the lower flanges 118, 120 of shapes 101, 103, respectively. A pair of lateral clamping members 122, 124 secured to each junction bloc 110, through bolts 126, 128 respectively, and having projections 130, 132 protruding into a longitudinal lateral groove of shapes 101, 103, respectively, clamp the shapes against the spacing plate 112. Intermediate linings 134, 136 of suitable anti-friction material, such as polytetrafluorethylene, may be interposed between the projections 130, 132 and the shapes 101, 103 and analogous linings 138, 140 between the shapes and the plate 112 to facilitate longitudinal expansion movements of the rail elements with respect to the stationary support members. Of course, the degree of tightening of screws 126, 128 should not be excessive to permit said movement. To this end, suitable abutments may be provided. The interfitting of the clamping members and of the junction-bloc with the shapes 101, 103, maintains at all times a perfect alignment of successive rail elements.

FIGS. 6 and 8 show in plan view and in elevational cross-section, respectively, an expansion joint between a pair of longitudinally aligned and spaced apart rail elements 101, 103. A pair of laterally spaced apart connector bars 142, consisting of extruded shapes of conductive material, connect aligned rail elements at each expansion joint. Each end portion of each shape 103, 101 is cut out at 144, 146, respectively, and the end portions of the connector bars 142 are also cut out at 148, 150 in a complementary shape so that the reduced end portions of the rail elements and of the connector bars interfit in a slidable relation permitting longitudinal expansion movements of the rail elements 101, 103 with respect to the connector bars 142 whereby the dihedral front contact surface 102, 104 is continued along the expansion joint by the connector bars. The transition zones 154 between the rail elements 101 and the corresponding connector bar 142 are longitudinally staggered with respect to the transition zones 152 between the rail elements 103 and the corresponding connector bar 142, as shown in FIG. 6, so that a contact shoe 106 engages the respective transition zones successively thereby diminishing the total reduction of the contact surface upon running over an expansion joint. The mechanical guiding of the contact shoe is also improved by this staggering. Preferably the outer end portions of the shapes 101, 103 and of the connector bars 142 are bevelled, as shown, to diminish the overhang surface of the contact shoe running over gaps 152, 154. In the shown embodiment, the connector bars 142 have a solid intermediate body portion defining a contact surface having the same width as that of the shapes 101, 103. As a consequence, a second transition interval 156, 158 is produced which is longitudinally offset with respect to the zones 154, 152 respectively, causing interfitting end portions of shapes 101, 103 and of connector bars 142 to overlap each other. Suitable electrical connections such as flexible strips 160, 162 interconnect adjacent rail elements. Preferably, each connector bar 142 is rigidly fixed to an insulating support member 164 through a junction-bloc 166 as shown in FIG. 8. Interfitting end portions of the rail elements 101, 103 and of the connector bars 142 have interfitting longitudinally extending guiding grooves and ribs as at 168, 170 so that the ends of the rail elements are perfectly guided in their expansion movements with respect to the stationary connector bars 142 which are rigidly fixed to the stationary support members 164, as stated above. The connector bars 142 can of course consist of a single suitable shaped part at each expansion joint.

What is claimed is:

1. An electrical distribution assembly comprising a conductor rail means including a plurality of longitudinally aligned and spaced apart extruded hollow rail elements having a front contact face adapted for sliding contact engagement with a movable current collecting system and a pair of opposite side faces, a plurality of stationary support members spaced apart along said conductor rail and having each a bearing portion in clamping relation with said side faces to permit longitudinal expansion and contraction movements of said rail elements with respect to said support members, said hollow rail elements defining an inner cavity extending along the entire length thereof, an extruded connector bar extending at the meeting end portions of each pair of successive rail elements telescopically a distance into the inner cavity of said end portions to permit expansion and contraction movements of said rail elements one with respect to the other, the end portions of said rail elements and of the connector bars having complementary shaped front contact faces to provide a continuous front contact surface along the entire length of said conductor rail for slidable contact with said current collecting system, said assembly further comprising between each pair of successive rail elements an extruded support element having a recess to accomodate the corresponding connector bar engaging said pair of rail elements telescopically, and means to support each support element fixedly from corresponding ones of said stationary support members.

2. An electrical distribution assembly, according to claim 1 wherein the front contact face of each end portion of each rail element has a longitudinally cut out portion communicating with said cavity, each connector bar having a complementary shaped end portion slidably fitting into said cavity and into said cut out portion.

3. An electrical distribution assembly, according to claim 2, whereinsaid support element and the cut out end portion of each rail element have cross sections which are substantially identically shaped.

4. A linearly extending electrical distribution assembly comprising:

three parallel non-coplanar substantially equidistant conductor rails, each conductor rail having a front contact face adapted for sliding contact engagement with a movable current collecting system, a back face, and a pair of opposite side faces, a plurality of generally C-shaped support brackets of molded insulating material extending transversely of said conductor rails and spaced apart along the length thereof, each support bracket having a base portion securable to a foundation and an arm projecting from said base portion and having the free end portion thereof overhanging said base portion, three bearing portions integrally formed on each support bracket: a first one adjacent said base portion, a second one at the free end of said arm, and the third one intermediate said first and second ones at the central portion of said arm, each bearing portion being shaped to contact and support one of said side faces and said back face of a corresponding one of said conductor rails for the acurate positioning thereof, and a removable clamp member for each bearing portion secured thereto and engaging the other side face of the corresponding conductor rail to clamp the latter against the bearing portion, in such a manner as to permit longitudinal motion of said conductor rails relative to said support brackets while clamped, said support brackets embracing said conductor rails in a manner providing a passageway for a current collecting support means between the conductor rails supported by said first and second bearing portions of said support brackets.

5. A linearly extending electrical distribution assembly comprising three parallel non-coplanar substantially equidistant conductor rails, each conductor rail including longitudinally aligned metal rail elements having a front contact face adapted for sliding contact engagement with a movable current collecting system and a pair of opposite side faces, said assembly further comprising a plurality of insulating support brackets extending transversely of said conductor rails and spaced apart along the length thereof, each support bracket having for each conductor rail a bearing portion in clamping relation with said side faces to permit longitudinal movement of said rail elements relative to said support brackets, said support brackets having a base portion securable to a foundation and an upper arm overhanging said base portion and carrying at the free end thereof one of said bearing portions so that said brackets embrace said conductor rails incompletely to provide a passageway for a current collecting support means between a pair of conductor rails along the entire length thereof, wherein each support bracket comprises a unitary generally C-shaped molded member of insulating material having integrally formed thereon three bearing surfaces to accommodate corresponding portions of said conductor rails, respectively, and three clamp members adapted for clamping said portions to said surfaces, respectively, each clamp member being removably securable to said support bracket, and wherein each said clamp member comprises a lip member of resilient material shaped for engagement in longitudinal sliding relation with one of said side faces of said rail elements, and bolt means to secure said clamp member to said support bracket.

* * * * *

UNITED STATES PATENT OFFICE
CERTIFICATE OF CORRECTION

Patent No. 3,790,725      Dated February 5, 1974

Inventor(s) Pierre CHARAMEL and Raymond BRESSON

It is certified that error appears in the above-identified patent and that said Letters Patent are hereby corrected as shown below:

Please rewrite column 8, lines 1 - 13 as follows:

secured thereto and engaging the other side face of the corresponding conductor rail to clamp the latter against the bearing portion, in such a manner as to permit longitudinal motion of said conductor rails relative to said support brackets while clamped, said support brackets embracing said conductor rails in a manner providing a passageway for a current collecting support means between the conductor rails supported by said first and second bearing portions of said support brackets.

Signed and sealed this 5th day of November 1974.

(SEAL)
Attest:

McCOY M. GIBSON JR.      C. MARSHALL DANN
Attesting Officer      Commissioner of Patents